Nov. 24, 1931.  C. E. ATTWOOD  1,833,882

FILE CABINET

Filed Dec. 3, 1925   6 Sheets-Sheet 1

Inventor:
Charles E. Attwood,
by Emery, Booth, Janney, Varney
Attys.

Nov. 24, 1931.  C. E. ATTWOOD  1,833,882
FILE CABINET
Filed Dec. 3, 1925    6 Sheets-Sheet 2

Inventor:
Charles E. Attwood,
by Emery, Booth, Janney & Varney
Attys.

Nov. 24, 1931.  C. E. ATTWOOD  1,833,882
FILE CABINET
Filed Dec. 3, 1925   6 Sheets-Sheet 3
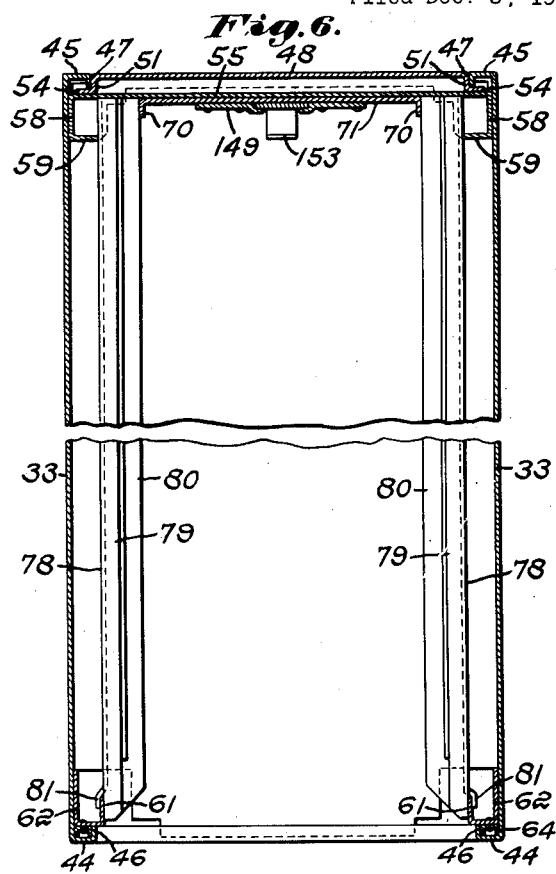
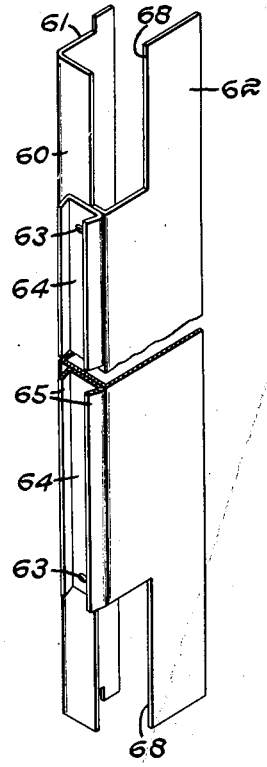
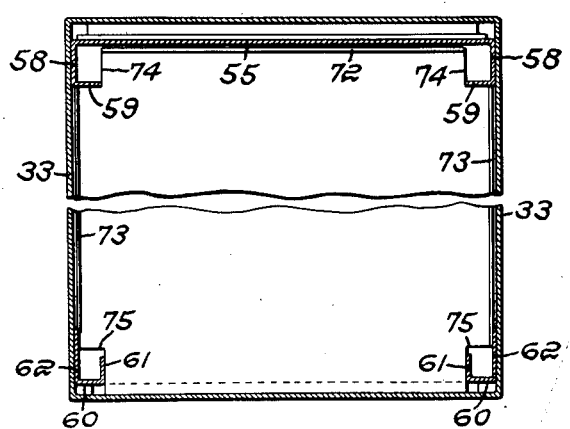
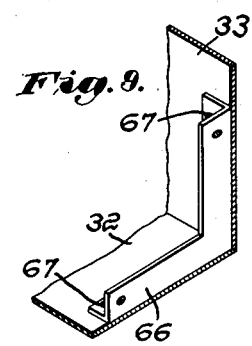
Inventor:
Charles E. Attwood,
by Attys

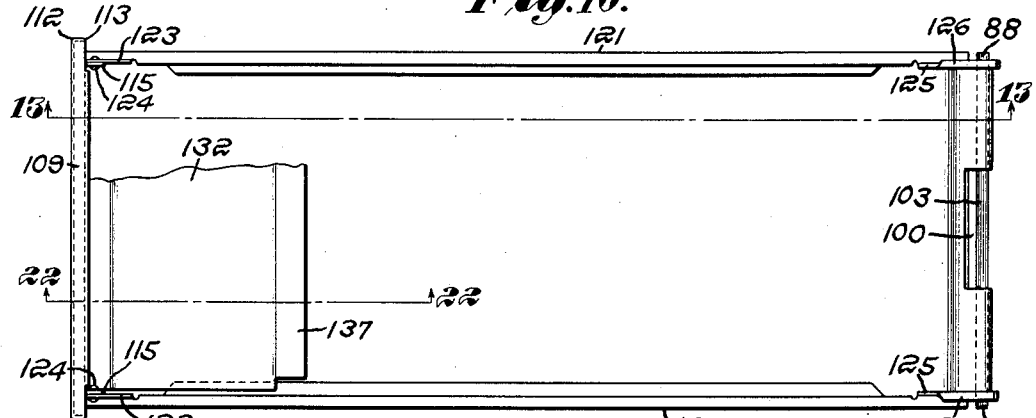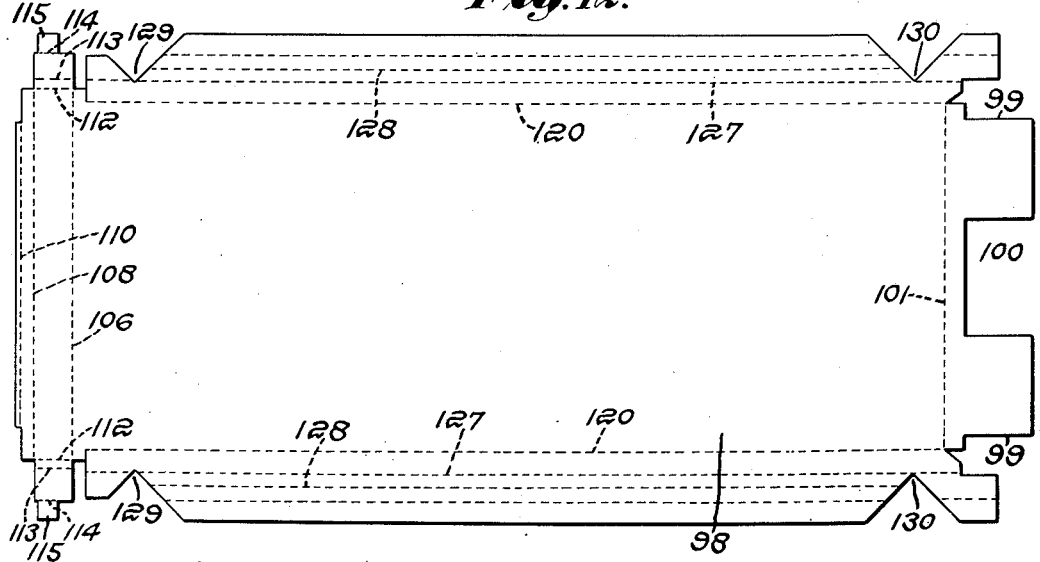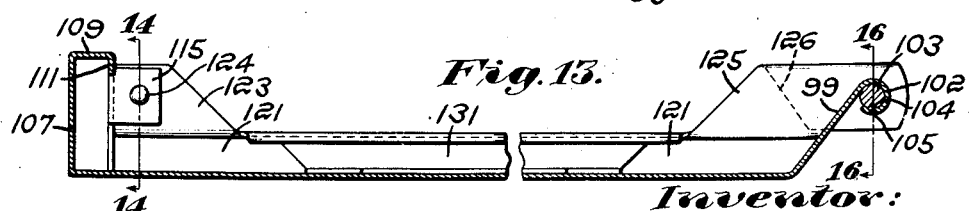

Nov. 24, 1931.    C. E. ATTWOOD    1,833,882
FILE CABINET
Filed Dec. 3, 1925    6 Sheets-Sheet 5
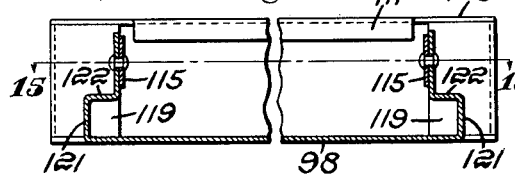
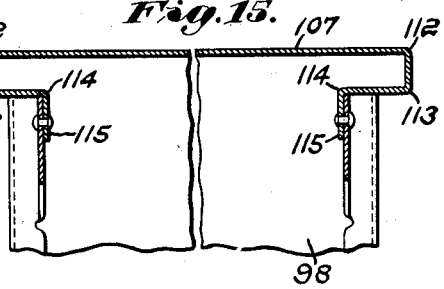
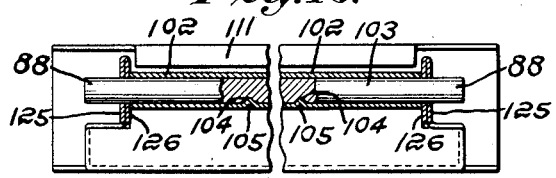
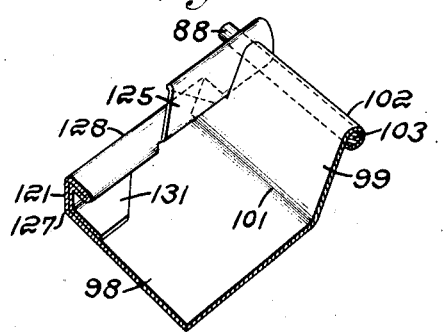
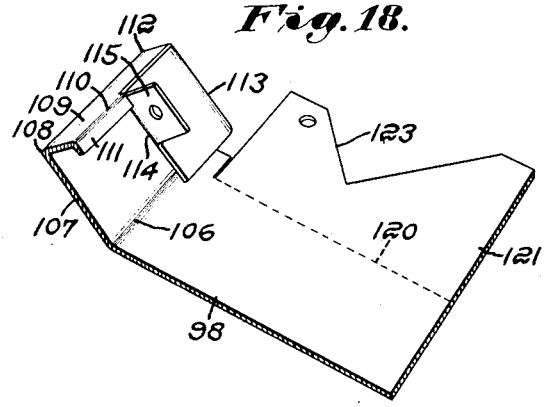
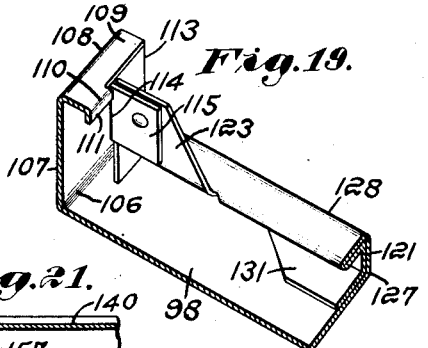
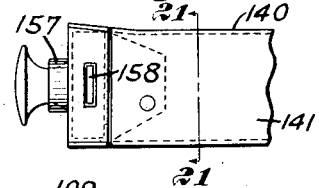
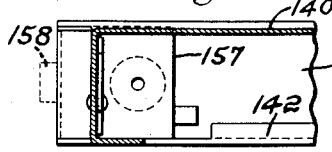
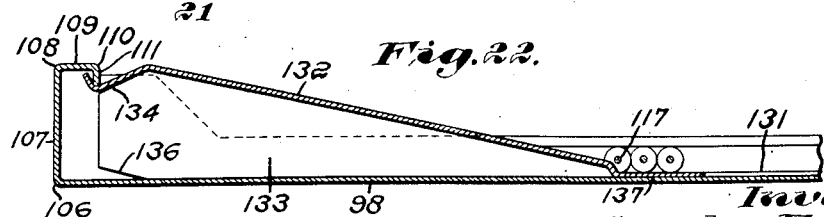

Nov. 24, 1931.  C. E. ATTWOOD  1,833,882
FILE CABINET
Filed Dec. 3, 1925   6 Sheets-Sheet 6
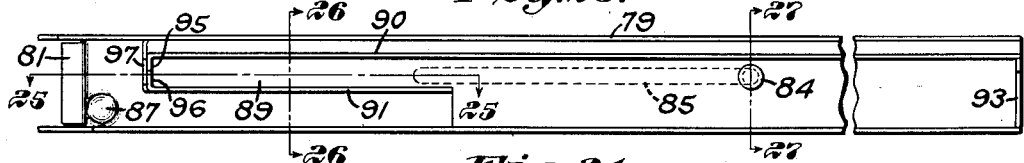
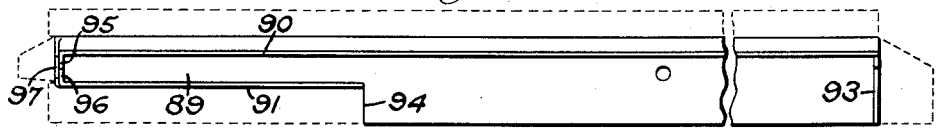
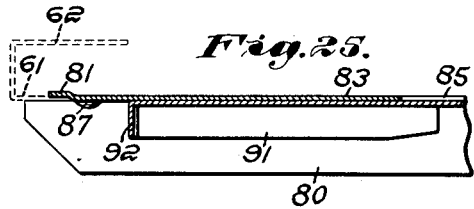
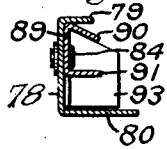
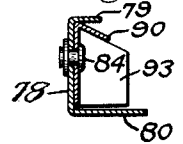
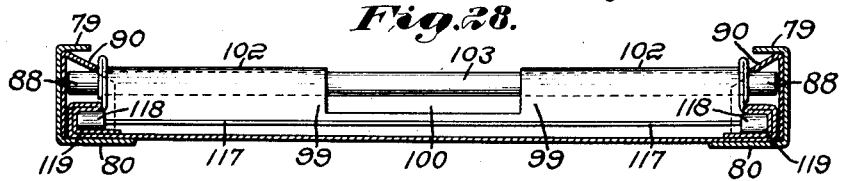
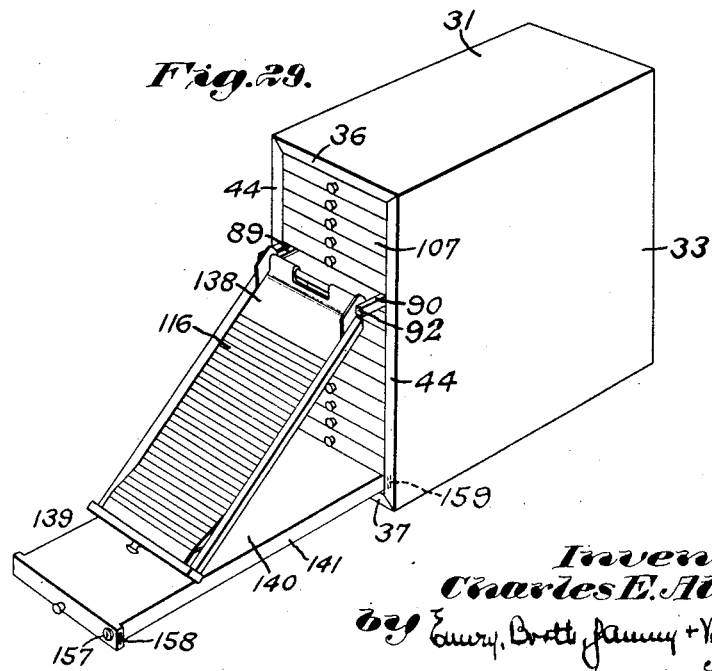

Patented Nov. 24, 1931

1,833,882

UNITED STATES PATENT OFFICE

CHARLES E. ATTWOOD, OF WOLLASTON, MASSACHUSETTS, ASSIGNOR TO POSTINDEX COMPANY, INC., OF BOSTON, MASSACHUSETTS, A CORPORATION OF MASSACHUSETTS

FILE CABINET

Application filed December 3, 1925. Serial No. 72,948.

This invention relates to a novel file cabinet having special utility in connection with the filing of card records, such as those of the overlapping type.

The invention will be best understood by reference to the following description, when taken in connection with the accompanying drawings of one specific embodiment thereof, while its scope will be more particularly pointed out in the appended claims.

In the drawings:

Fig. 3 is a vertical longitudinal section on line 3—3 of Fig. 2;

Fig. 6 is a horizontal sectional view on line 6—6 of Fig. 2;

Fig. 7 is a sectional view on line 7—7 of Fig. 2;

Fig. 8 is a perspective view of one of the two pillars at the front corners of the cabinet;

Fig. 9 is a perspective view illustrating a means of reinforcement of the corners of the cabinet by angle brackets;

Fig. 10 is a plan of one of the drawers;

Fig. 11 is a side elevation of the drawer shown in Fig. 10;

Fig. 12 is a plan of the blank from which the drawer is made;

Fig. 13 is a sectional view on an enlarged scale on line 13—13 of Fig. 10;

Fig. 14 is a sectional view on line 14—14 of Fig. 13;

Fig. 15 is a sectional view on line 15—15 of Fig. 14;

Fig. 16 is a sectional view on line 16—16 of Fig. 13;

Fig. 17 is a perspective view showing the construction of a rear corner of one of the drawers;

Fig. 18 is a perspective view illustrating the mode of bending the blank to form a front corner of one of the drawers;

Fig. 19 is a perspective view of the completed front corner;

Fig. 20 is a side elevation showing the front end of the drawer rest and lock;

Fig. 21 is a sectional view on line 21—21 of Fig. 20;

Fig. 22 is a sectional view on an enlarged scale on line 22—22 of Fig. 10;

Fig. 23 is a side elevation of one of the drawer guides and its associated extension slide;

Fig. 24 is a side elevation of the extension slide shown in Fig. 23;

Fig. 25 is a sectional view on line 25—25 of Fig. 23;

Fig. 26 is a sectional view on line 26—26 of Fig. 23;

Fig. 27 is a sectional view on line 27—27 of Fig. 23;

Fig. 28 is a sectional view on an enlarged scale on line 28—28 of Fig. 4; and

Fig. 29 is a perspective view of the complete cabinet with the drawer rest and one of the drawers drawn out and tilted down onto the drawer rest.

Figure 2:
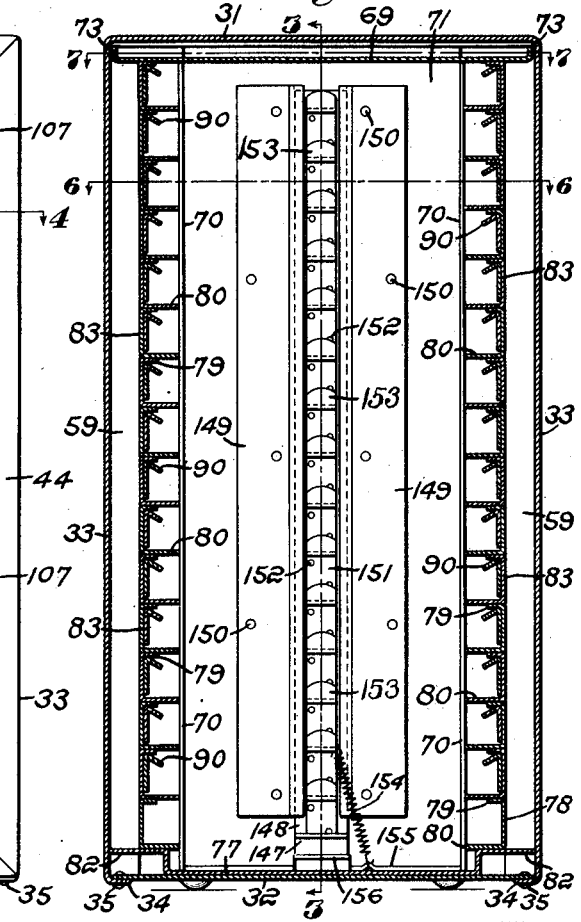
Fig. 2 is a cross sectional view of the cabinet looking toward the rear, with the drawers removed.

Referring to the drawings, and to the embodiment of the invention which is selected for exemplification, and having reference at first more particularly to Fig. 2, the cabinet comprises a sheet metal shell having top and bottom walls 31 and 32, and two side walls 33. In the present example, the top and sides are conveniently formed of a single piece of sheet metal bent to required shape, while the bottom is formed of a separate piece of sheet metal inserted between the side walls and conveniently secured thereto as by providing the side walls with inwardly-directed, integral flanges 34, upon which the bottom wall rests, and to which it may be secured, as by rivets 35.

Figure 1:
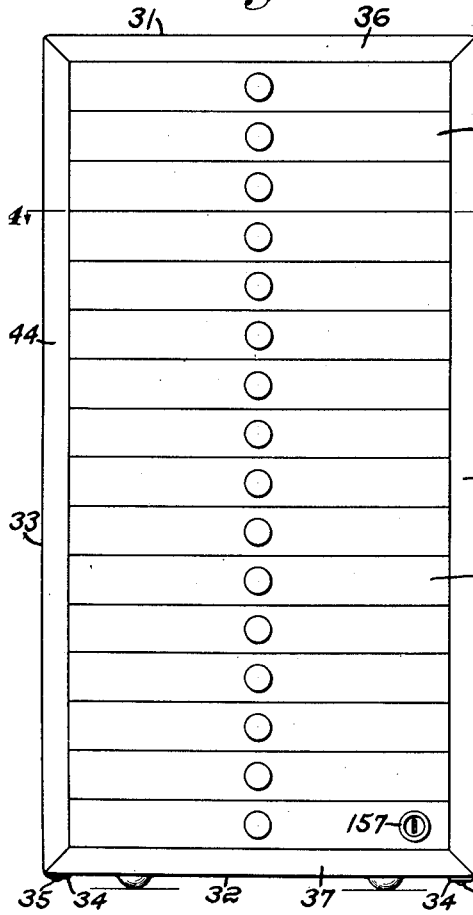
Fig. 1 is a front elevation of a file cabinet exemplifying the invention.

Referring now to Fig. 1, the top and bottom walls are provided with flanges 36 and 37, which are directed toward each other at the front of the cabinet, and similar flanges 38 and 39 (shown at the right-hand side of Fig. 3) at the rear of the cabinet. The flanges 36 and 37 (see the left-hand side of Fig. 3) have inwardly-directed marginal portions 40 and 41, while the flanges 38 and 39 have similar inwardly-directed, marginal portions 42 and 43 (see the right-hand part of Fig. 3). Referring now to Fig. 6, the side walls 33 are provided at the front of the cabinet with flanges 44, which are directed toward each other, and at the rear of the cabinet there are similar flanges 45, which are directed toward each other. The flanges 44 have inwardly-directed, marginal portions 46, and the flanges 45 have similar inwardly-directed, marginal portions 47.

At the rear of the cabinet, the described four walls with their flanges present an opening which is closed by a fifth wall 48 (see Fig. 6). This wall is provided with inwardly-directed upper and lower flanges 49 and 50 (see the right-hand side of Fig. 3), and at its sides with similar inwardly-directed flanges 51 (see Fig. 6). This wall is flush with the rear end of the cabinet, and is inserted into its place from the inside of the cabinet. Movement of the rear wall in an outward direction is conveniently limited by providing its flanges 49 and 50 with outwardly directed margins 52 and 53 (see Fig. 3), and by providing the flanges 51 with similar outwardly directed margins 54 (see Fig. 6). In practice, the rear wall fits the opening which receives it so snugly that friction alone is usually sufficient to hold it in place, but in the present example, it is further held in place by an inner rear wall 55 (see Fig. 6), which rests against the outwardly-directed marginal portion of the flanges on the outer rear wall. The inner rear wall herein is provided at its upper end with a flange 56 (see Fig. 3), which is doubled upon itself to provide an additional thickness, as at 57. Referring again to Fig. 6, the inner rear wall 55 is further provided with side flanges 58, which are snugly fitted between the side walls 33, and have inwardly-directed marginal portions 59.

The front corners of the cabinet receive pillars 60, one of which is shown in detail in Fig. 8. Herein, this pillar is conveniently formed of a piece of sheet metal, bent to present a channel bar having rearwardly directed flanges 61 and 62. To the front of this channel bar there is secured, as by rivets 63, a second channel bar 64, having forwardly directed flanges 65. This bar, which is narrower than the other, interlocks with the shell or casing of the cabinet by being received between the side walls 33 and the inwardly directed margins 46 of the flanges 44. When, therefore, the pillar 60 is in its place, it is immovable, and can be removed only by rearward displacement. Its rearward movement, however, is normally prevented by the drawer guides presently to be described.

Each corner of the cabinet in the present example is reinforced by an angle bracket 66, one of which is shown in Fig. 9, the same being appropriately secured in place, as by rivets 67. These brackets are snugly fitted into the channels presented by the adjacent walls and flanges, and their inwardly directed margins. Referring now to Fig. 8, it will be observed that the channel bar 64 terminates short of the top and bottom of the channel bar 60, in which it is secured, and the channel bar 60 is provided at top and bottom with openings 68. In this way, interference between these channel bars and the reinforcing brackets is prevented.

The upper portion of the cabinet (see Fig. 3) is provided with a ceiling 69, comprising a plate whose front margin (at the left of Fig. 3) is conveniently supported by the inwardly directed flange 40. The rear end of the ceiling is conveniently supported by the outer ends of flanges 70 (shown at the right-hand side of Fig. 3, but possibly better illustrated in Figs. 2 and 6) formed on the plate 71, which is secured to the inner rear wall 55.

Referring again to the right-hand portion of Fig. 3, the ceiling is held against upward movement by being provided with an upwardly directed flange 72 (shown also in Fig. 7), which is beneath the flange 56 presented by the inner wall 55, and along its longitudinal edges, the ceiling is provided with upwardly directed flanges 73 (see Fig. 2), which assist in preventing its upward displacement. When, therefore, the latter is in place, the ceiling is securely locked in place. Referring now to Fig. 7, the rear corners of the ceiling are cut away, as at 74, to provide spaces for the margins 59 of the flanges 58, and at the front corners, the ceiling is cut away, as at 75, to provide spaces for the channel bars 60. Referring to the upper left-hand portion of Fig. 3, the inwardly directed margins 40 of the flange 36 in some cases might present an obstruction on which the contents of the upper drawer will catch. To prevent such a possibility, in the present example the inner edge of the margin 40 may be jointed to the ceiling by solder 76, which presents an inclined surface to cause the contents of the upper drawer to ride beneath the flange without catching thereon.

Referring now to the lower portion of Fig. 2, as well as to the lower part of Fig. 3, there is provided a removable inner floor 77, which is conveniently formed of a plate laid upon the bottom wall or floor 32. This inner floor is inserted before the inner rear wall 55 is put in its place, and therefore the lower end of the latter, particularly its flange 57, locks the inner floor in place, and prevents its removal, inasmuch as the front end of the inner floor lies beneath the inwardly directed margins 41 of the flange 37. In fact, the inner rear wall 55 is the key piece, so to speak, which locks in place the hereinbefore described removable parts of the cabinet, and this key piece must be removed to permit removal of such other parts. This key piece, moreover, locks in place the rear ends of the drawer guides presently to be described. This is easily accomplished by first grasping the lower end of the wall 55 and drawing the same in a forward and downward direction, whereupon it will be found that the flange 56 at its upper end, which overlies the top of the ceiling, can be unhooked from the latter.

The drawer guides will now be described, reference being had to Fig. 2. Each drawer guide in the present example is in the form of a channel bar 78, having upper and lower flanges 79 and 80, the upper flange in the present instance being narrower than the lower one. Referring now to the upper portion of Fig. 6, it will be observed that the width of the flange 80 is such that it snugly fits the space between the flanges 59 and 70, which therefore hold the rear end of the drawer guide against lateral displacement. The front end of the drawer guide is held against lateral displacement by an interlocking engagement with the flange 61 of the vertical channel bars 60. In the present example, this is conveniently accomplished by slitting the web of the drawer guide to form a tongue 81, which is laterally offset to overlie one face of the flange 61, while the projecting ends of the flanges 79 and 80 overlie the opposite face of said flange. Before the wall 71 is put into place, the drawer guides can be assembled by first fitting their front ends onto the upright flanges 61, and then swinging the rear ends of the drawer guides horizontally into place, after which the wall 71 is interposed.

The lowermost channel bar 78 is supported by an elevated flange 82 (see the lower portion of Fig. 2), which is struck up from the inner floor 77, the height of such flange being substantially the same as that of the inwardly-directed margin 41 of the flange 37 (see the lower left-hand portion of Fig. 3). The remaining drawer guides of each series engage and support one another in assembling the structure. These drawer guides are simply stacked up in their proper places, after which the wall 71, which has been referred to as the key-piece, is introduced, and the drawer guides are then securely locked in place.

The drawer guide extension slides will now be described, reference being had at first to Fig. 5. Herein, each slide is in the form of a bar 83, which is disposed flatwise against, and is guided by, the web of the drawer guide, it being held in place and limited as to longitudinal movement by appropriate means, herein a rivet 84, which is secured to and carried by the extension slide and travels to and fro in an elongated slot 85 presented by the drawer guide. The length and position of the slot are such that the front end of the extension slide, although normally occupying a position inwardly beyond the front face of the cabinet (see the lower left-hand corner of Fig. 5), can be carried forward to a position beyond the front face of the cabinet (see the lower right-hand corner of Fig. 5). This enables the extension slide to afford support for the drawer beyond the front face of the cabinet.

Figure 5:
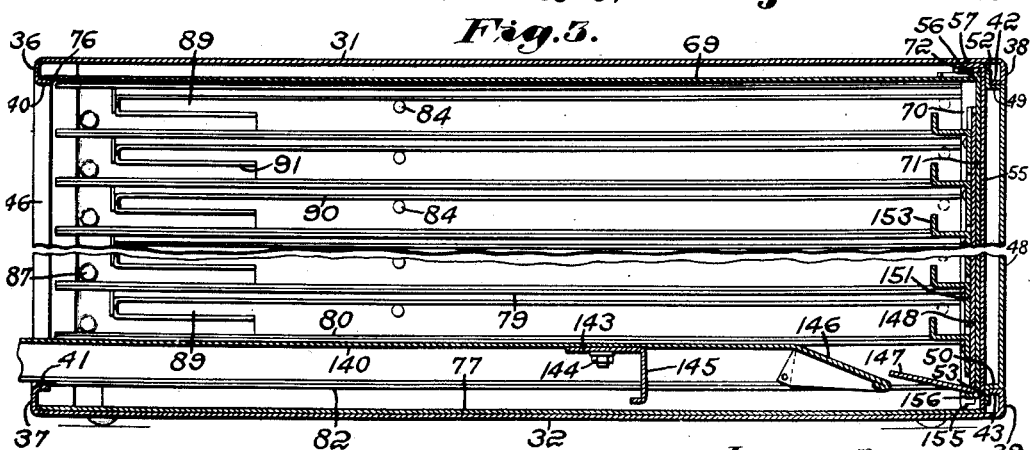
Fig. 5 is a sectional view, similar to Fig. 4, illustrating the mode of detaching a drawer from and attaching it to its slides.

Each pair of drawer guides supports and guides an appropriate drawer, such as the drawer 86, a portion of which is shown in Fig. 5. When the drawer is in its guides, it is held against lateral displacement by appropriate means, herein rounded protuberances 87 (see Fig. 4), presented by the webs of the drawer guides. These protuberances are also shown in Fig. 3. They are conveniently formed by simply stamping the metal, which constitutes the web of the drawer guide to form a cup-like extrusion.

When one of the drawers is fully withdrawn from the cabinet, it is desirable that it shall be capable of being swung downward into some such position as that illustrated in Fig. 29, while still supported by its extension slides. To this end, therefore, the drawer is provided with two trunnions 88 (see Fig. 5), which, in the extended position of the slides occupy channels 89 presented by the latter. By reference to Fig. 3, it will be observed that these channels are closed at their front ends, and have upper and lower flanges 90 and 91. Herein, the upper flange extends the whole length of the slide, while the lower flange is comparatively short. The closed front end of the channel presents an abutment 92, which is engaged by the associated trunnion 88 in the forward movement of the latter, and in this way, the extension slide is projected from the front of the cabinet into a position where it will afford support for the trunnion. On the other hand, when the drawer is pushed back into the cabinet, the rear end of the drawer strikes an abutment 93, as a result of which the slide is carried in a rearward direction to its normal position.

When the drawer is withdrawn from the cabinet, carrying with it the extension slides to the position in which the drawer can be swung about its trunnions while remaining supported by the slides, accidental disengagement of the drawer from the slides is impossible, because the upper flange of the trunnion-receiving channel is uninterrupted, and the trunnions cannot be lifted out. This will be evident from an examination of Fig. 29. However, intentional removal of the drawer from the slides can be accomplished with the greatest facility by withdrawing one of the slides, leaving the other in its retracted position (see Fig. 5). When the slides are thus related, the drawer may then be placed in an oblique position, in which the trunnions can be withdrawn from the channels. This is sometimes desirable when the circumstances are such that the user wishes to take the drawer away to some other place to inspect the records which it carries.

The details of construction of the drawer guides and their respective extension slides are well illustrated in Figs. 23 to 27, inclusive. The extension slide in the present example is conveniently formed of a piece of sheet metal (the outline of the blank being indicated in dotted lines in Fig. 24), having one entire longitudinal edge bent to form the upper flange 90, while the lower flange 91, which is comparatively short, is conveniently formed by slitting the metal along the line 94, and bending that portion of the metal which is at the left of the slit in Fig. 24 laterally. This forms the desired channel, the front end of which can be closed conveniently by bending the terminal portion of the flange 90 in a downward direction, as at 95, bending the terminal portion of the flange 91 in an upward direction, as at 96, and finally bending the terminal portion of the web laterally as at 97, thus making three thicknesses of metal to form the stop 92.

The construction of the drawers will now be described, reference being had at first to Fig. 12. The body of the drawer is conveniently formed of a single piece of sheet metal, designated generally by the numeral 98, having an irregular formation. The blank is shown in Fig. 12. At the rear end (at the right of Fig. 12), the blank presents two tabs 99, which are separated by a space 100. To form the rear end of the drawer, the plate 98 is bent in an upward direction along the line 101 (Fig. 12) into the oblique position represented in Fig. 13, and the ends of the tabs 99 are rolled as at 102 to receive a rod 103, the ends of which present the hereinbefore described trunnions 88. The rod, when inserted, is conveniently held in place by providing the same with a depression 104 (see Fig. 13), into which some of the metal of the tab is forced, as at 105, thereby to form an interlocking engagement between the tab and the rod.

The front end of the drawer blank is bent along a line 106 (see Fig. 12), to present a flange 107 (see Fig. 13), which forms the drawer front. This flange is bent along a line 108 in a rearward direction, to present a rearwardly-directed flange 109, and this in turn is bent along a line 110, to present a downwardly-directed flange 111. The ends of the flange 107 are bent first rearwardly along lines 112, then inwardly toward each other along lines 113, and finally rearwardly along lines 114, to present rearwardly-directed tabs 115, to which the drawer sides are secured, as will presently appear. Thus it is evident that the drawer front has a box-like formation, which will be clearly apparent from an inspection of Figs. 13, 14 and 15. The ends of the drawer front project laterally from its sides and limit inward movement of the drawer by engaging the front faces of the pillars 60 (see Fig. 4).

The character of the drawer sides will depend largely upon the character of the filing elements. The drawer illustrated herein is intended to receive filing elements comprising overlapping cards or sheets 116 (see Fig. 29), carried by sheet carriers, one of which is illustrated in Fig. 28, the same comprising a flexible bar or wire 117, presenting appropriate terminal portions, such as cylindrical trunnions 118, which are received in channels 119 presented by the drawer sides. Referring now to Fig. 12, the longitudinal margins of the blank are bent upwardly along lines 120, to form upwardly-directed longitudinal flanges 121 (see Fig. 13), constituting the drawer sides. These drawer sides will be appropriately formed to present the channels 119 for the ends of the sheet-supporting bars. Referring now to Fig. 14, it is evident that the formation of these channels calls for an offset formation of the drawer sides, the latter to this end having inwardly directed portions 122.

Great strength is imparted to the drawer front by securing its rearwardly-directed tabs 115 to upwardly-directed portions 123 of the drawer sides, as by rivets 124. Also at the rear end of the drawer, an exceedingly strong, rigid structure is provided by attaching the drawer sides to the transverse rod 103, this being conveniently accomplished by the provision of upwardly-directed portions 125 of the drawer sides, which are folded downwardly upon themselves as at 126 to provide a double thickness of metal shown in section in Fig. 16, and this double thickness is perforated to receive the terminal portions of the rod 103. This has the effect of giving increased strength to the drawer sides, as well as to the upwardly-directed tabs to which the rod is secured.

Referring again to Fig. 12, the channeled formation of the drawer sides is given by bending the same along lines 127 and 128. If, as in the present example, a low-sided drawer is desired, the greater part of the upwardly-directed flange 121 may be folded downward and utilized to reinforce the channeled sides. Herein, this is conveniently accomplished by providing the blank near its front end with notches 129, and near its rear end with notches 130. Intermediate these notches, the metal may then be folded downwardly and inwardly to provide a reinforcement 131 (see Fig. 19), which gives the drawer side a double thickness of metal. This low-sided construction for the drawer makes the writing and examination of the records more convenient than would be the case with a high-sided drawer.

At the front of the drawer, an inclined rest or writing surface, on which the cards may rest, is conveniently provided by the use of a plate 132 (see Fig. 22), having depending marginal flanges 133, which are received between the drawer sides and rest on the drawer bottom. It is conveniently held in place by bending the front edge of the plate, first in a downward direction as at 134, and then in an upward direction to present a lip or flange 135, which can be hooked under the depending flange 111 of the drawer front. Thus accidental displacement of the plate is impossible, and its removal can be accomplished only by lifting its rear end to unhook its front end from the drawer front. Herein, the depending flanged sides are beveled, as at 136, to facilitate the tilting of the plate in engaging the same with, and disengaging the same from, the drawer front. The rear end of the plate is conveniently prevented from rising by providing the same with an offset portion 137, which underlies one or more, herein several, of the sheet-carrying bars 117, removal of which is necessary before the rear end of the plate can be lifted to unhook its front end from the drawer front. At the rear end of the drawer, the cards may be protected by a plate 138 (see Fig. 29) hooked at its rear end.

Referring now to Fig. 29, the drawers, when drawn out, can be caused to rest upon an underlying rest 139, whose general characteristics in the present example resemble those of the drawers, except that the rest is inverted, so to speak,—that is to say, it comprises a plate 140, whose flanged sides 141 are depending, instead of upstanding. These flanges herein are reinforced by providing the same with inwardly-directed margins 142 (see Fig. 21). The front of the rest is identical in formation and appearance with the drawer fronts, and presents a uniform appearance therewith when the cabinet is closed. Outward movement of the drawer rest herein is limited by the provision of a bracket 143 (see Fig. 3), secured to the rest as by bolts 144, and provided with a depending lug 145, which is adapted to engage the flange 37 at the front of the cabinet, and to limit the forward movement of the rest.

Figure 4:
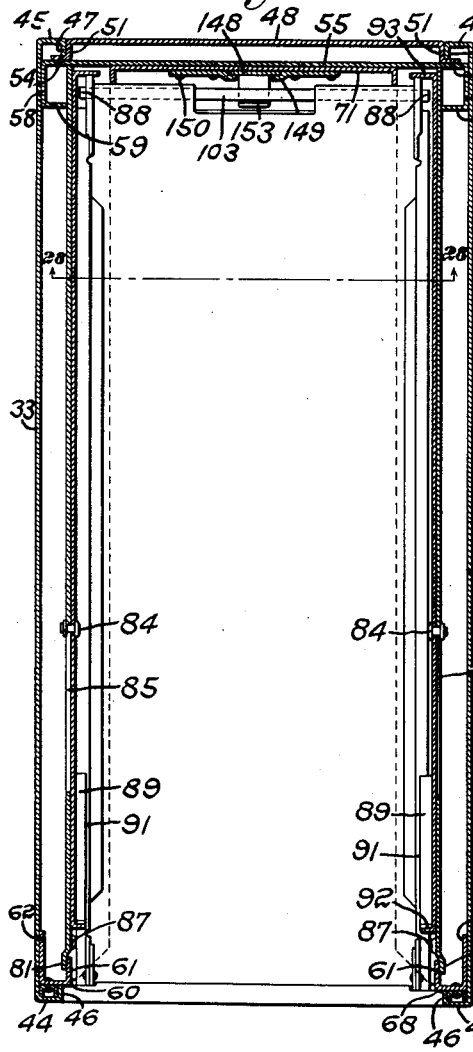
Fig. 4 is a horizontal sectional view on line 4—4 of Fig. 1, showing the parts in their normal positions.
Figure 5:
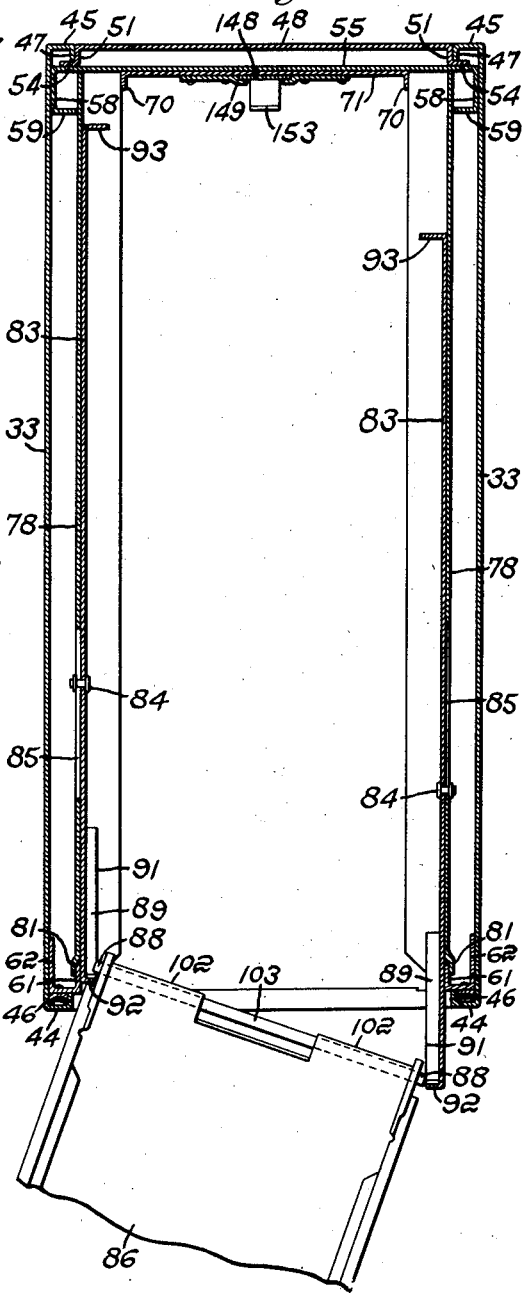

In the present embodiment, the drawer rest provides a convenient means for locking all of the drawers simultaneously. To this end, the drawer rest is formed to present an inclined plane as at 146 to engage the underside of a similar inclined plane 147 presented by a vertically movable, drawer-locking slide 148, which, as shown in Fig. 4, is guided by the front face of the plate 71 and by two marginal guides 149, suitably secured as by rivets 150 to said plate. Referring now to Figs. 2 and 3, this slide carries a set of drawer-locking elements herein brackets 151 secured to the slide as by rivets 152, and presenting forwardly and upwardly directed projections 153 adapted to present obstructions to removal of the drawers by being projected into the paths of the rods 103 at the rear ends of the drawers. This is accomplished by rearward movement of the lower rest, which causes its inclined plane 146 to engage the inclined plane 147, and lifts the drawer-locking slide 148, thus locking all the drawers simultaneously. When, on the other hand, the drawer rest is drawn forward to a sufficient extent, the drawer-locking slide will naturally gravitate to a position in which its locking projections 153 are no longer in the paths of the rods 103. While gravity alone might be depended upon to cause the locking slide to descend when thus released, it is preferable to employ a spring such as the spring 154 (see Fig. 2), having one end attached to the locking slide and the other to a convenient, fixed point, such as a flange 155 presented by the lower end of the plate 71. Descent of the slide under the influence of gravity, and of the spring, may be limited, as by a second flange 156 near the lower end of the plate.

When the drawer rest is in its innermost position, therefore, it locks the drawers, but to be effective to do so, the rest itself must be locked. To that end, the rest herein is provided with a lock 157 (see Figs. 20 and 21), of common form, having a usual bolt 158, which may be projected into engagement with an opening 159 provided therefor (see Fig. 29) in the inwardly-directed margin 46 of the right-hand flange 44.

Having thus described one embodiment of the invention, but without limiting myself thereto, what I claim and desire by Letters Patent to secure is:

1. In a file cabinet, the combination of a casing, a pair of drawer guides within said casing, a pair of extension slides slidably supported by said drawer guides and adapted to be drawn forward to extend beyond the front of said casing, said slides presenting abutments at their front ends and uninterrupted flanges along the top, and a drawer supported and guided by said extension slides and presenting trunnions which travel beneath said flanges, said flanges preventing said trunnions from being lifted from said slides.

2. In a metallic cabinet, the combination of four walls of sheet metal presenting four flanges which are directed toward each other and have marginal portions which are directed inwardly generally parallel with said walls and form a rectangular opening, and a fifth wall of sheet metal inserted outwardly into and closing said opening and presenting on all four edges flanges which are directed inwardly generally parallel with said four walls and have marginal portions about said opening, which marginal portions are directed outwardly toward said walls.

3. In a metallic cabinet, the combination of four walls of sheet metal presenting flanges which are directed toward each other and have marginal portions which are directed inwardly generally parallel with said walls and form a rectangular opening, and a fifth, rectangular wall of sheet metal closing said opening and having its outer face lying in a plane containing the adjacent edges of said four walls, said fifth wall presenting on all four edges flanges which are directed inwardly generally parallel with said four walls and have marginal portions about said opening which are directed outwardly toward said walls.

4. In a metallic cabinet, the combination of top, bottom and side walls, an outer rear wall, an inner rear wall presenting abutments spaced from said side walls, and drawer guides each received between one of said abutments and one of said side walls.

5. In a cabinet, the combination of a casing presenting side walls, a vertical series of drawers between said walls, and two sets of separate, individually distinct drawer guides, each set being spaced from one of said side walls, the guides of each set being arranged in vertical series and supported independently of said side walls, each guide of each set, except the lowermost guide of such set, being supported by the guide therebelow.

6. In a cabinet, the combination of a casing presenting side walls, a vertical series of drawers between said walls, and two sets of drawer guides, the guides of each set being arranged in vertical series and supported independently of said side walls, and means maintaining each vertical series of guides in spaced relationship with one of said side walls.

7. In a cabinet, the combination of a casing presenting side walls, a vertical series of drawers between said walls, and two sets of drawer guides, the guides of each set being arranged in vertical series and supported independently of said side walls, a wall presenting means maintaining the rear ends of said guides in spaced relationship with said side walls, and means adjacent the front of said casing maintaining the front ends of said guides in spaced relationship with said side walls.

8. In a cabinet, the combination of a casing presenting side walls, a vertical series of drawers between said walls, and two sets of drawer guides, the guides of each set being arranged in vertical series and supported independently of said side walls, a wall presenting means spacing the rear ends of said guides from said side walls, a wall presenting means spacing the rear ends of one vertical series of guides from the rear ends of the other vertical series of guides, and means spacing the front ends of said guides from said side walls.

9. In a cabinet, the combination of a casing presenting side walls, a vertical series of drawers between said walls, two sets of drawer guides, the guides of each set being arranged in vertical series and supported independently of said side walls, means maintaining the rear ends of each vertical series of guides spaced from said side walls and maintaining one vertical series spaced from the other, and means interengaging with the front ends of both vertical series of guides maintaining one series spaced from the other and maintaining each series spaced from the adjacent side wall.

10. In a cabinet, the combination of a casing presenting side walls, a vertical series of drawers between said walls, two sets of drawer guides, the guides of each set being arranged in vertical series and supported independently of said side walls, means maintaining the rear ends of each vertical series of guides spaced from said side walls and maintaining one vertical series spaced from the other, and means presenting rearwardly directed flanges interengaging with the front ends of both vertical series of guides maintaining one series spaced from the other and maintaining each series spaced from the adjacent side wall.

11. In a cabinet, the combination of a casing presenting side walls, a front opening, and on each side of said front opening a rearwardly directed flange which with the adjacent side wall of said casing forms a rearwardly facing interior channel, a vertical series of drawers between said walls, two sets of drawer guides, the guides of each set being arranged in vertical series and supported independently of said side walls, means received in said channels and maintaining the front ends of said guides against lateral displacement, and means maintaining the rear ends of said guides against lateral displacement.

12. In a metallic cabinet, the combination of four walls of sheet metal which form the boundaries of a rectangular opening, a fifth, rectangular wall of sheet metal closing said opening and presenting on all four edges inwardly directed flanges fitting within the sides of said opening, and a sixth wall of sheet metal disposed inwardly with relation to and spaced from said fifth wall by engagement with said flanges.

13. In a metallic cabinet, the combination of four walls of sheet metal which form the boundaries of a rectangular opening, a fifth, rectangular wall of sheet metal closing said opening and presenting on all four edges inwardly directed flanges fitting within the sides of said opening, and a sixth wall of sheet metal disposed inwardly with relation to and spaced from said fifth wall by engagement with said flanges, said sixth wall being provided with flanges engaging two of said four walls.

14. In a cabinet, the combination of a casing, a series of drawers within said casing, two sets of separate, individually distinct drawer guides, each set comprising a vertical series of guides, each guide, except the lowermost, having as its sole support the guide therebelow, and retaining means having detachable engagement with said guides to retain the same against lateral displacement, whereby removal of said retaining means permits said guides to be removed separately from said casing.

15. In a cabinet, the combination of a casing, a series of drawers within said casing, two sets of separate, individually distinct drawer guides, each set comprising a vertical series of guides, the guides of each set being arranged in vertical series, retaining means having detachable engagement with said guides to retain the same against lateral displacement, and retaining means above the uppermost guides to retain said guides against upward displacement, whereby removal of both of said retaining means permits said guides to be removed separately from said casing.

16. In a cabinet, the combination of a casing, a series of drawers within said casing, two sets of separate, individually distinct drawer guides, each set comprising a vertical series of guides, each guide, except the lowermost, having as its sole support the guide therebelow, said casing presenting means having detachable interlocking engagement with the guides of each series to lock them in place.

17. In a cabinet, the combination of a casing, a series of drawers within said casing, two sets of separate, individually distinct drawer guides, each set comprising a vertical series of guides, each guide, except the lowermost, having as its sole support the guide therebelow, means engaging one set of ends of said guides to hold them definitely positioned, and means engaging the other set of said guides to hold them definitely positioned.

18. In a cabinet, the combination of a casing, a series of drawers within said casing, two sets of separate, individually distinct drawer guides, each set comprising a vertical series of guides, each guide, except the lowermost, having as its sole support the guide therebelow, and retaining means interlocking with the front ends of said guides to hold them against lateral displacement.

19. In a cabinet, the combination of a casing, a series of drawers within said casing, two sets of separate, individually distinct drawer guides, each set comprising a vertical series of guides, the guides of each set being arranged in vertical series, retaining means having detachable engagement with said guides to retain the same against lateral displacement, and a ceiling plate interposed between the uppermost guides and the top of said casing to retain said guides against upward displacement.

20. In a cabinet, the combination of a casing, a series of drawers within said casing, two sets of separate, individually distinct drawer guides, each set comprising a vertical series of guides, the guides of each set being arranged in vertical series, retaining means having detachable engagement with said guides to retain the same against lateral displacement, and a ceiling plate interposed between the uppermost guides and the top of said casing and having spacing means to space the same from the top of said casing to retain said guides against upward displacement.

21. In a cabinet, the combination of a casing, a series of drawers within said casing, two sets of separate, individually distinct drawer guides, each set comprising a vertical series of guides, each guide, except the lowermost, having as its sole support the guide therebelow, said casing having inwardly directed flanges having interengagement with the guides of both series to hold said guides against lateral displacement.

22. In a cabinet, the combination of a casing, a series of drawers within said casing, two sets of separate, individually distinct drawer guides, each set comprising a vertical series of guides, each guide, except the lowermost, having as its sole support the guide therebelow, said casing having inwardly directed flanges having interengagement with the guides of both series to hold one set of ends against lateral displacement, and means interposed between the guides of one series and the guides of the other series to hold the other set of ends of one series against lateral displacement toward the other series.

23. In a cabinet, the combination of a casing, a series of drawers within said casing, two sets of separate, individually distinct drawer guides, each set comprising a vertical series of guides, each guide, except the lowermost, having as its sole support the guide therebelow, said casing having inwardly directed flanges interengaging with the guides of both series to hold one set of ends against lateral displacement, means interposed between the guides of each series and the sides of said casing to hold the other set of ends against lateral displacement toward the sides of said casing, and means interposed between the guides of one series and the guides of the other series to hold said other set of ends against lateral displacement toward the other series.

In testimony whereof, I have signed my name to this specification.

CHARLES E. ATTWOOD.